US007161785B2

(12) United States Patent
Chawgo

(10) Patent No.: US 7,161,785 B2
(45) Date of Patent: Jan. 9, 2007

(54) APPARATUS FOR HIGH SURGE VOLTAGE PROTECTION

(75) Inventor: Shawn M. Chawgo, Liverpool, NY (US)

(73) Assignee: John Mezzalingua Associates, Inc., East Syracuse, NY (US)

( * ) Notice: Subject to any disclaimer, the term of this patent is extended or adjusted under 35 U.S.C. 154(b) by 429 days.

(21) Appl. No.: 10/664,522

(22) Filed: Sep. 17, 2003

(65) Prior Publication Data

US 2004/0057186 A1 Mar. 25, 2004

Related U.S. Application Data

(63) Continuation-in-part of application No. 09/726,821, filed on Nov. 30, 2000, now Pat. No. 6,683,773.

(51) Int. Cl.
*H02H 1/00* (2006.01)

(52) U.S. Cl. ...................................................... 361/119

(58) Field of Classification Search ................. 361/119
See application file for complete search history.

(56) References Cited

U.S. PATENT DOCUMENTS

| | | | | |
|---|---|---|---|---|
| 2,922,913 | A | 1/1960 | Cushman | |
| 3,883,774 | A * | 5/1975 | Volkenau et al. | 315/58 |
| 3,980,976 | A | 9/1976 | Tadama et al. | |
| 4,456,800 | A * | 6/1984 | Holland | 200/5 A |
| 4,695,920 | A | 9/1987 | Klebba et al. | |
| 4,828,506 | A | 5/1989 | Tuckwood | |
| 4,884,982 | A | 12/1989 | Fleming et al. | |
| 5,215,478 | A | 6/1993 | Briones | |
| 5,246,388 | A | 9/1993 | Collins et al. | |
| 5,326,280 | A | 7/1994 | Briones et al. | |
| 5,342,210 | A | 8/1994 | Trine et al. | |
| 5,397,250 | A | 3/1995 | Briones | |
| 5,631,444 | A | 5/1997 | Rook | |
| 5,674,083 | A | 10/1997 | Whiteman, Jr. et al. | |
| 5,724,220 | A | 3/1998 | Chaudhry | |
| 5,820,393 | A | 10/1998 | Edgley et al. | |
| 5,969,924 | A * | 10/1999 | Noble | 361/56 |
| 6,036,545 | A | 3/2000 | Caviness et al. | |
| 6,467,414 | B1 * | 10/2002 | Fisher | 102/202.4 |
| 6,493,198 | B1 * | 12/2002 | Arledge et al. | 361/56 |
| 6,683,773 | B1 * | 1/2004 | Montena | 361/119 |

* cited by examiner

*Primary Examiner*—Ronald Leja
(74) *Attorney, Agent, or Firm*—Wall Marjama & Bilinski LLP

(57) ABSTRACT

A surge protection element for a conventional cable connector includes a printed circuit board preferably shaped as two concentric rings connected by two spokes. The outer ring is electrically connected to the grounded portion of the cable connector body. A printed circuit trace on one of the spokes is separated from a printed circuit trace on the inner ring by a spark gap. If a high voltage surge is carried by the coaxial cable transmission line, a spark is formed in the gap. As a consequence, the high voltage surge is transferred to the surge protection element which in turn conducts the electricity to the grounded body of the connector.

17 Claims, 7 Drawing Sheets

APPARATUS FOR HIGH SURGE VOLTAGE PROTECTION

CROSS-REFERENCE TO RELATED APPLICATIONS

This application is a continuation in part of application U.S. application Ser. No. 09/726,821 filed Nov. 30, 2000 now U.S. Pat. No. 6,683,773 and entitled HIGH VOLTAGE SURGE PROTECTION ELEMENT FOR USE WITH CATV COAXIAL CABLE CONNECTORS, incorporated herein by reference.

FIELD OF THE INVENTION

The present invention relates generally to devices for interconnecting coaxial cable to CATV systems, and more particularly to surge protection devices that protect the integrity of electronic components positioned within interconnect devices from high voltage surges of electricity.

BACKGROUND OF THE INVENTION

In the CATV industry, cable television signals are traditionally transmitted by coaxial cable. As the cable is extended through a distribution network, several types of electrical devices, such as filters, traps, amplifiers, and the like, are used to enhance the signal and ensure signal integrity throughout the transmission. It is therefore necessary to prepare a coaxial cable for interconnection to these devices in such a manner so as to ensure that the signal is not lost or disrupted.

In a traditional interconnection of the coaxial cable to the electrical device, the coaxial cable is attached in axially aligned relation to a conductive pin extending outwardly from the electrical device. The pin then transmits the signal from the coaxial cable to the electrical device. A conductive lead extending rearward from the electrical device carries the electrically treated signal to the distribution cable in the CATV system.

It is also necessary to terminate a coaxial cable distribution line at its end point. To terminate the coaxial cable, its central conductor is interconnected to a termination connector, such as a UMTR (Universal Male Terminator). The termination connector includes a first end, a body portion which defines a cavity, electrical components mounted within the cavity such as a capacitor to dissipate the charge, a resistor for impedance matching purposes, and an end cap that concludes the connector. The central conductor of the coaxial cable is electrically attached to a pin extending outwardly from the electrical components. As used herein, "connector" refers to either a termination type connector or any other standard coaxial cable connectors used in a CATV system.

On occasion, a high voltage surge is transmitted through the coaxial cable, for instance, due to a lightning strike. If this high voltage surge is permitted to be picked up by the input pin and transmitted to the electrical device within the connector, the device becomes inoperable due to the electrical components essentially melting or otherwise deteriorating as a consequence of the surge. A new connector then needs to be installed at the site of the surge.

A cable connector having a device that provides an alternate path for high voltage surges of electricity in order to protect the integrity of any electrical components positioned within the connector is therefore highly desired.

SUMMARY OF THE INVENTION

Briefly stated, a surge protection element for a conventional cable connector includes a printed circuit board preferably shaped as two concentric rings connected by two spokes. The outer ring is electrically connected to the grounded portion of the cable connector body. A printed circuit trace on one of the spokes is separated from a printed circuit trace on the inner ring by a spark gap. If a high voltage surge is carried by the coaxial cable transmission line, a spark is formed in the gap. As a consequence, the high voltage surge is transferred to the surge protection element which in turn conducts the electricity to the grounded body of the connector.

According to an embodiment of the invention, a surge protection element for use in a cable connector includes a printed circuit board including an inner ring and a first arm extending outward from the inner ring; a first trace on at least a portion of the inner ring, the first trace being disposed such that the first trace is electrically connected to a signal portion of the cable connector when the surge protection element is installed in the cable connector; and a second trace on at least a portion of the first arm, the second trace being disposed such that the second trace is electrically connected to a ground portion of the cable connector when the surge protection element is installed in the cable connector; wherein the first and second traces are separated by a spark gap.

According to an embodiment of the invention, in a CATV system that includes a coaxial cable having a central conductor, an outer conductor concentrically positioned in surrounding relation thereto, and a dielectric layer disposed between the central and outer conductors, a high voltage surge protection device adapted for use in the CATV system includes a connection housing having a first end and a body portion that defines an internal cavity; an electronic component positioned within the cavity; and a surge protection element positioned entirely within the cavity and between the body portion and the electronic component, wherein the element includes a printed circuit board which includes an inner ring and a first arm extending outward from the inner ring; a first trace on at least a portion of the inner ring, the first trace being disposed such that the first trace is electrically connected to the electronic component; and a second trace on at least a portion of the first arm, the second trace being disposed such that the second trace is electrically connected to the housing; wherein the first and second traces are separated by a spark gap.

DETAILED DESCRIPTION OF THE PREFERRED EMBODIMENT

Figure 1:
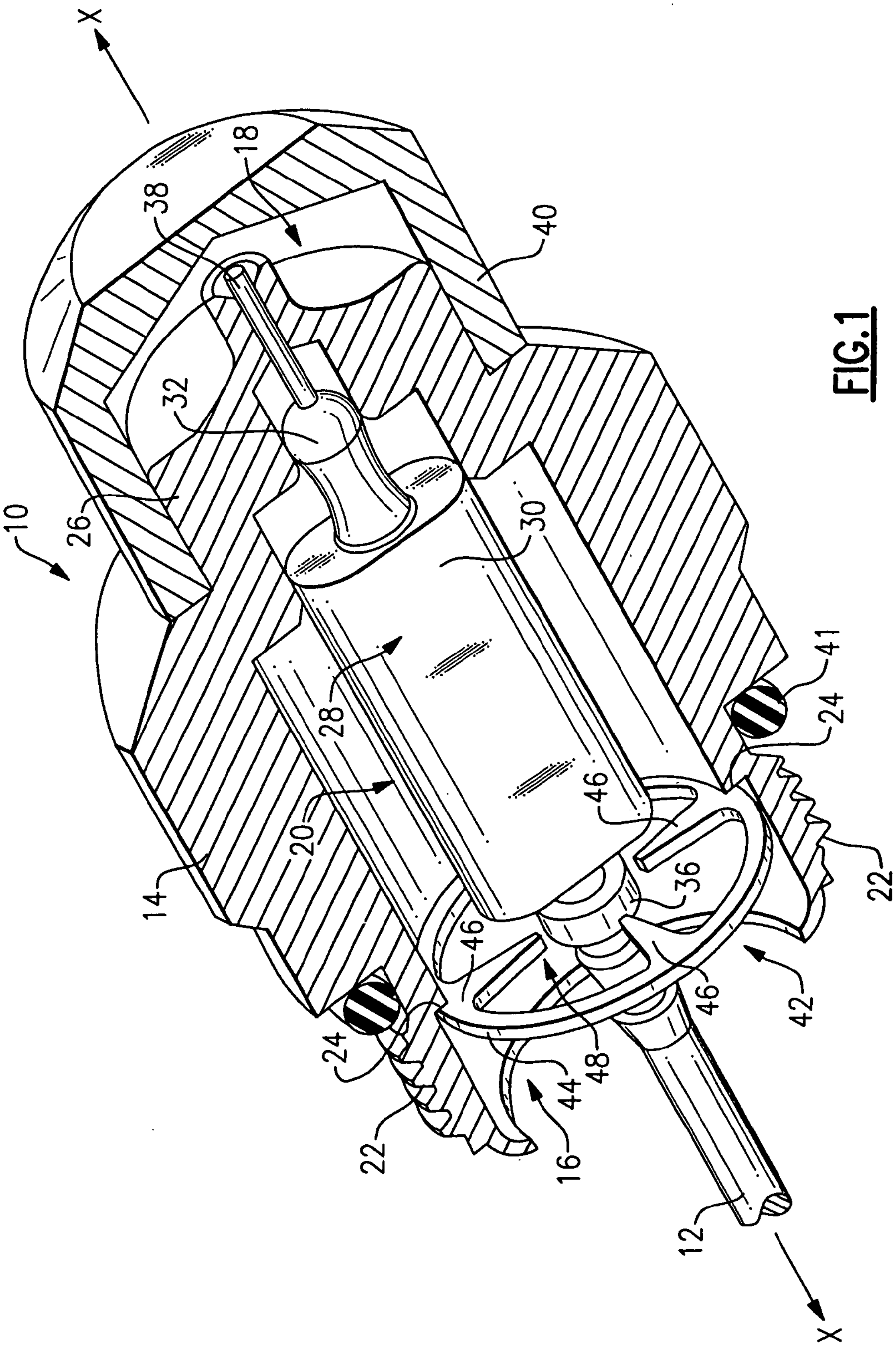
FIG. 1 shows a partial, longitudinal cross-sectional view of a CATV system, including a coaxial cable connector according to an embodiment of the invention.
Figure 2:
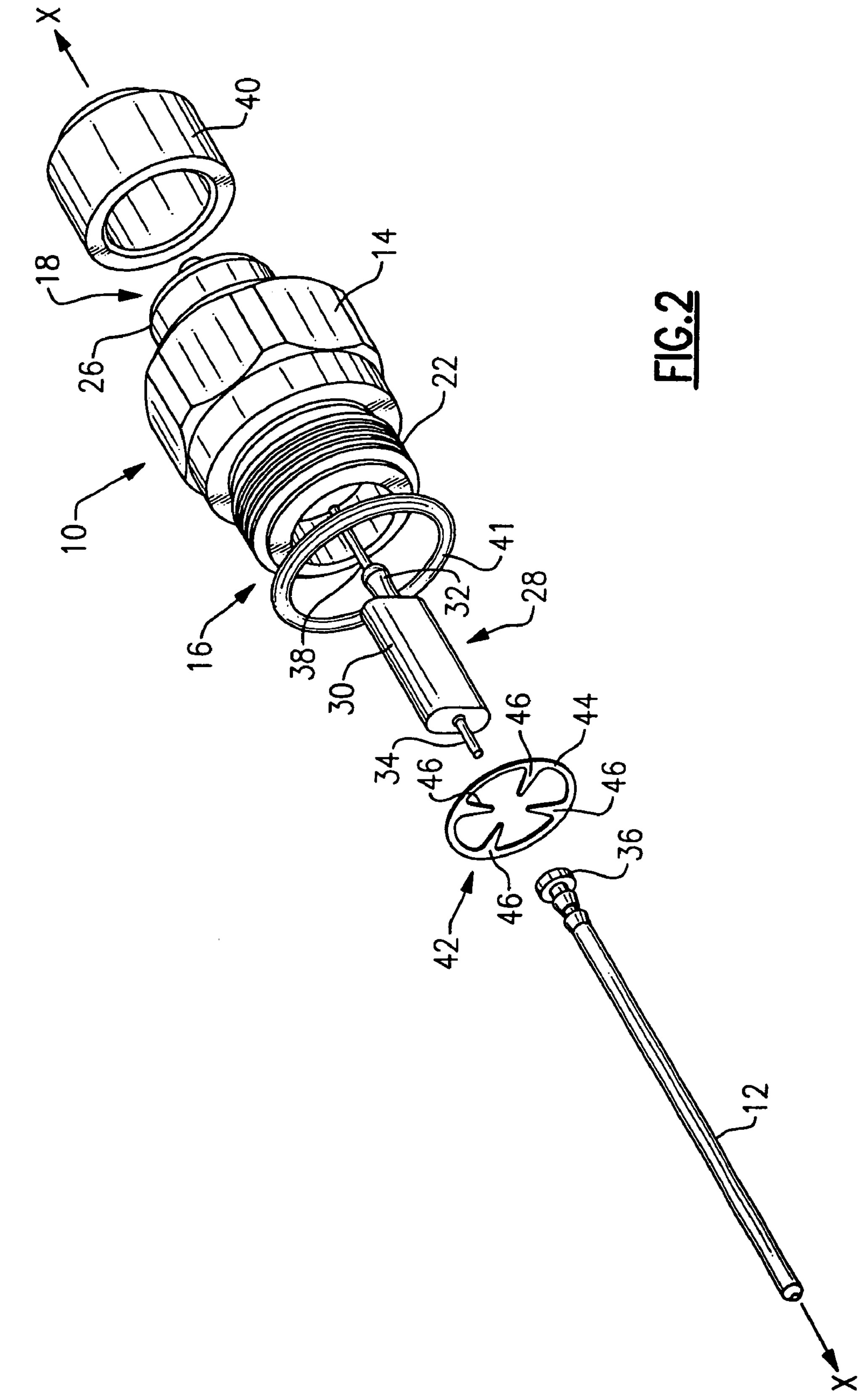
FIG. 2 shows an exploded perspective view of the embodiment of FIG. 1.

Referring to FIGS. 1–2, a connector 10, shown here as a termination connector, extends along a longitudinal axis X—X. Although a termination connector is not connected directly to a cable, a cable connector forms a direct electrical connection with a coaxial cable. Although not expressly illustrated in the drawings, it should be understood that the coaxial cable includes a central conductor immediately surrounded by a layer of dielectric material of predetermined thickness, an outer conductor concentric with the central conductor and surrounding the dielectric material, and an optional outer layer of insulating material surrounding the exterior surface of the outer conductor.

Connector 10 generally includes a conductive body 14 having a first end 16, a second end 18, and a cavity 20 defined therein. Body 14 includes an externally threaded portion 22 positioned at its first end 16, a shoulder 24 formed interiorly of threaded portion 22 at the interface of first end 16 and cavity 20, and a rear end 26 formed at second end 18. It should be understood that although connector 10 is illustrated as being a "male" UMTR (Universal Male Terminator) termination connector, the present invention works equally well with female connectors and other standard type connectors used in a CATV system.

An electrical component, designated generally by reference numeral 28, and shown illustrated as being composed of a capacitor 30 and a resistor 32 extending rearward therefrom, is positioned within cavity 20. It should be understood that electrical component 28 could be any standard type of electrical component that is incorporated into coaxial cable conductors, such as integrated circuits that form filters, amplifiers, traps, and the like. A pin 34 is soldered or otherwise connected to electrical component 28 and extends forward therefrom along longitudinal axis X—X. Pin 34 terminates in a head 36 of a conductive pin 12 at which point it is electrically interconnected to conductive pin 12. Electrical component 28 further includes a lead 38 which extends rearward from resistor 32 along longitudinal axis X—X that is soldered or otherwise securely connected to rear end 26 of body 14.

Connector 10 further includes a standard end cap 40 positioned in covering relation to second end 18 to protect the connection of lead 38 to body 14, among other things, and an O-ring 41 positioned at the interface of body 14 and threaded portion 22 which prevents moisture, dust, and other contaminants from entering connector 10.

Under normal operating conditions, the coaxial cable carries and transmits 90 Volts AC. There may be occasions, however, where high voltage surges impact upon and are carried by the coaxial cable, such as, for example, in the event it is struck by lightening. If this high voltage surge were to be transmitted to pins 12 and 34 and then carried to electrical component 28, the devices comprising electrical component 28 would in most instances become inoperable as they would not be able to receive such surges without their conductive elements melting or otherwise deteriorating.

Figures 3, 3A, 3B, 3C, 3D:
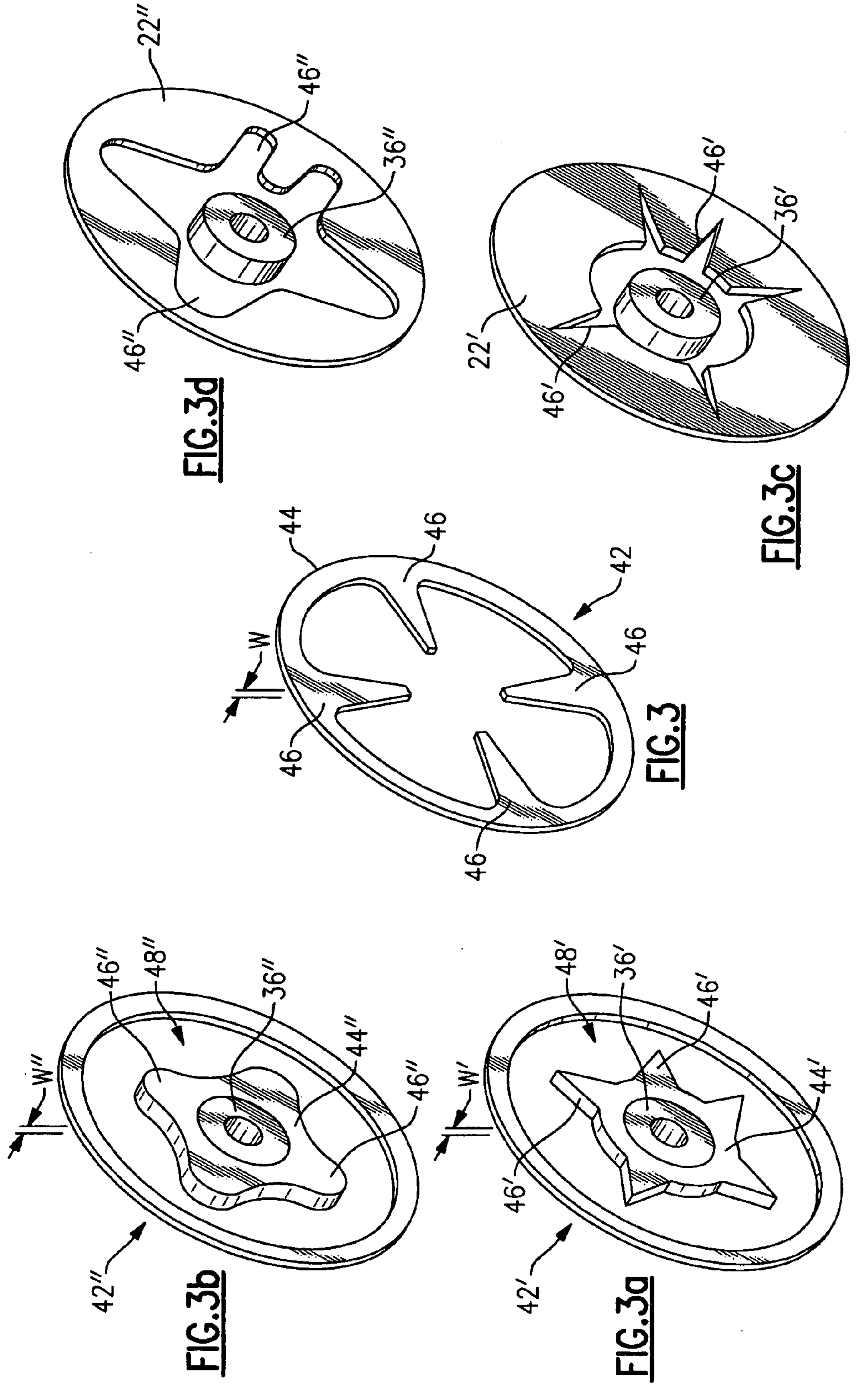
FIG. 3 shows a perspective view of a first embodiment of a surge protection element used in the embodiments of the present invention.
FIG. 3A shows a perspective view of a second embodiment of a surge protection element.
FIG. 3B shows a perspective view of a third embodiment of a surge protection element.
FIG. 3C shows a perspective view of a fourth embodiment of a surge protection element.
FIG. 3D shows a perspective view of a fifth embodiment of a surge protection element.

Referring also to FIG. 3, to prevent a damaging amount of such high voltage surges from being transmitted to electrical component 28, the present invention includes a surge protection element 42, which is composed of a conductive material, such as bronze, and is of a predetermined width W. Surge protection element 42 generally includes a ring-shaped outer body 44 and at least one prong 46 extending radially inward therefrom. Although surge protection element 42 is illustrated in the drawings as including four, equally spaced apart prongs 46, it has been found that three prongs 46 work just as well, and they need not be equally spaced apart, and one (or any number) prong would also work. The width W and material composition of surge protection element 42 dictate how much voltage element 42 can withstand, but element 42 has been found to withstand voltages of up to 6,000 Volts at 3,000 Amps for a period of 50 microseconds when composed of brass and of a width W of about 0.020 inches, as is required by IEEE Specification 62.41.

Surge protection element 42 is positioned with its body portion 44 in electrically conductive contact with shoulder 24, and prong(s) 46 extending radially inward therefrom. To ensure that body portion 44 remains in electrically conductive contact to shoulder 24 of conductive body 14, surge protection element 42 is press fit or otherwise securely engaged with connector 10. When in this position, prong(s) 46 are positioned in close proximity to, but in non-contacting relation to, head 36, thereby leaving a spark gap 48 therebetween (FIG. 1). As is well known in the art, the dielectric strength of air is 3,000,000 Volts/Meter and thus a voltage of 300 Volts produces a spark in an air gap of 0.1 mm. Thus, the size of spark gap 48 dictates the voltage level at which surge protection element 42 triggers the electric current to pass through body 14 and go to ground instead of through electrical component 28.

Thus, in the event of a high voltage surge of electricity passing through connector 10, if the surge is above a predetermined value as determined by the size of spark gap 48, a spark arcs across gap 48, and the majority of current runs through prong(s) 46 and to ground through the conductive connection between body portion 44 and shoulder 24. A small amount of current may pass into connector 10, but due to the differences in resistive properties between surge protection element 42 and electrical component 28, only a non-harmful amount of current will pass into connector 10. Accordingly, surge protection element 42 protects electrical components 28 from high voltage surges of electricity by providing an alternate path for the current that goes around the components and to ground through body 14.

Referring to FIG. 3A, an alternate embodiment of surge protection element 42' is illustrated. Surge protection element 42' includes a ring-like body 44', such as a washer, with at least one prong 46' integrally formed on and extending radially outward from a head 36' of pin 34'. Prongs 46' are defined by star shaped protrusions extending radially outwardly from head 36'. Again, surge protection element 42' would work if it included only a single, or any other number of protrusions 46'.

Referring to FIG. 3C, surge protection element 42' is optionally composed of only head 36' having at least one prong 46' extending radially outward therefrom, provided the length of each prong 46' is sufficient to leave an appropriate spark gap between their ends and the internal surfaces of a threaded portion 22' of connector body 14.

Referring to FIG. 3B, a surge protection element 42" includes a ring-like body 44" such as a washer, with at least one prong 46" integrally formed on and extending radially outward from a head 36" of a pin 34". Prongs 46" are defined by annularly extending, sinusoidal curved shaped protrusions extending radially outward from head 36". Again, surge protection element 42" would work if it included only a single, or any other number of protrusions 46".

Referring to FIG. 3D, surge protection element 42" is optionally composed of only pin 34" having at least one prong 46" extending radially outward therefrom, provided the length of each prong 46" is sufficient to leave an appropriate spark gap between its end and the internal surfaces of threaded portion 22" of connector body 14.

Figure 4:
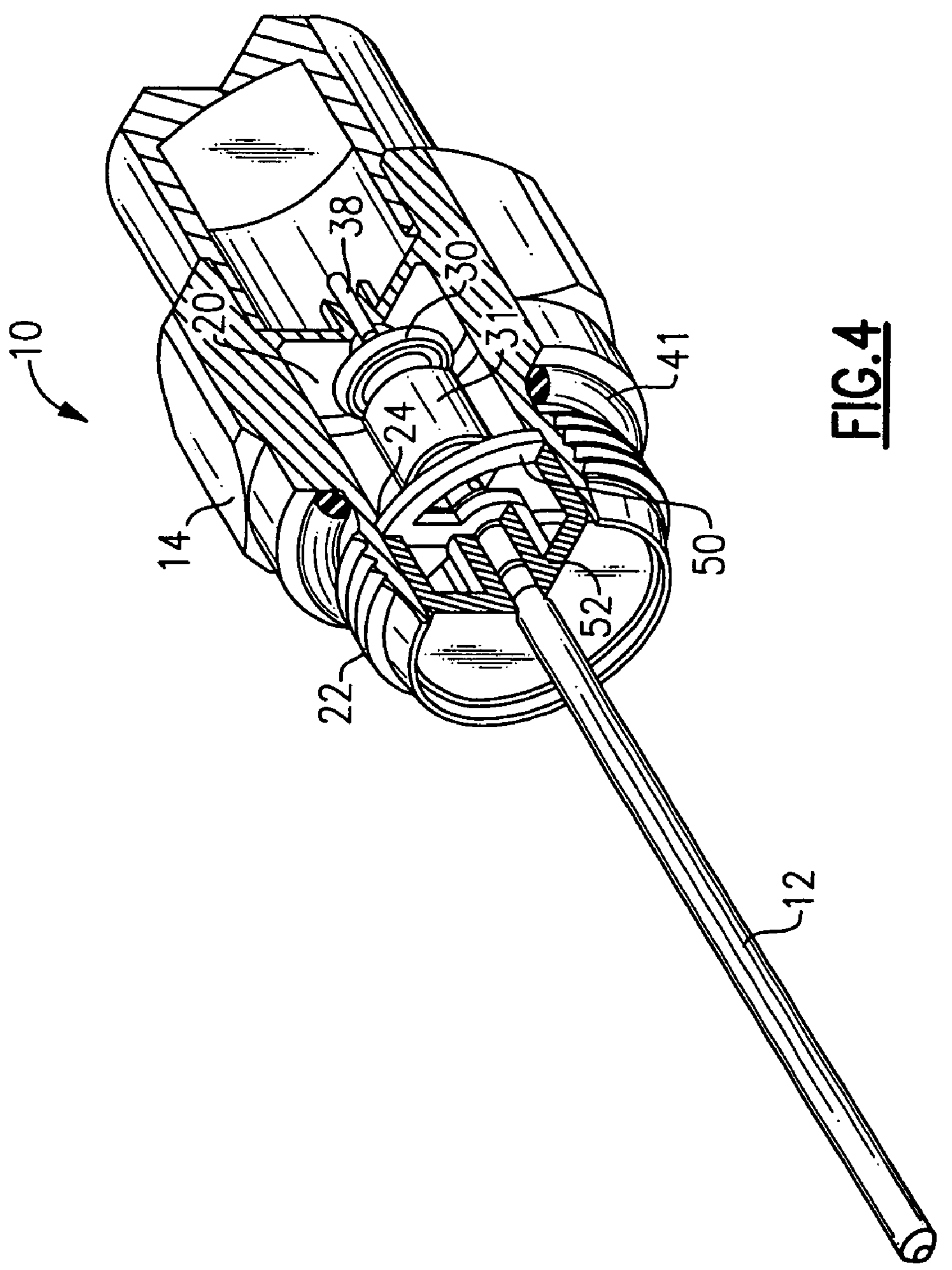
FIG. 4 shows a partially cutaway perspective view of device using a sixth embodiment of the invention.
Figure 5:
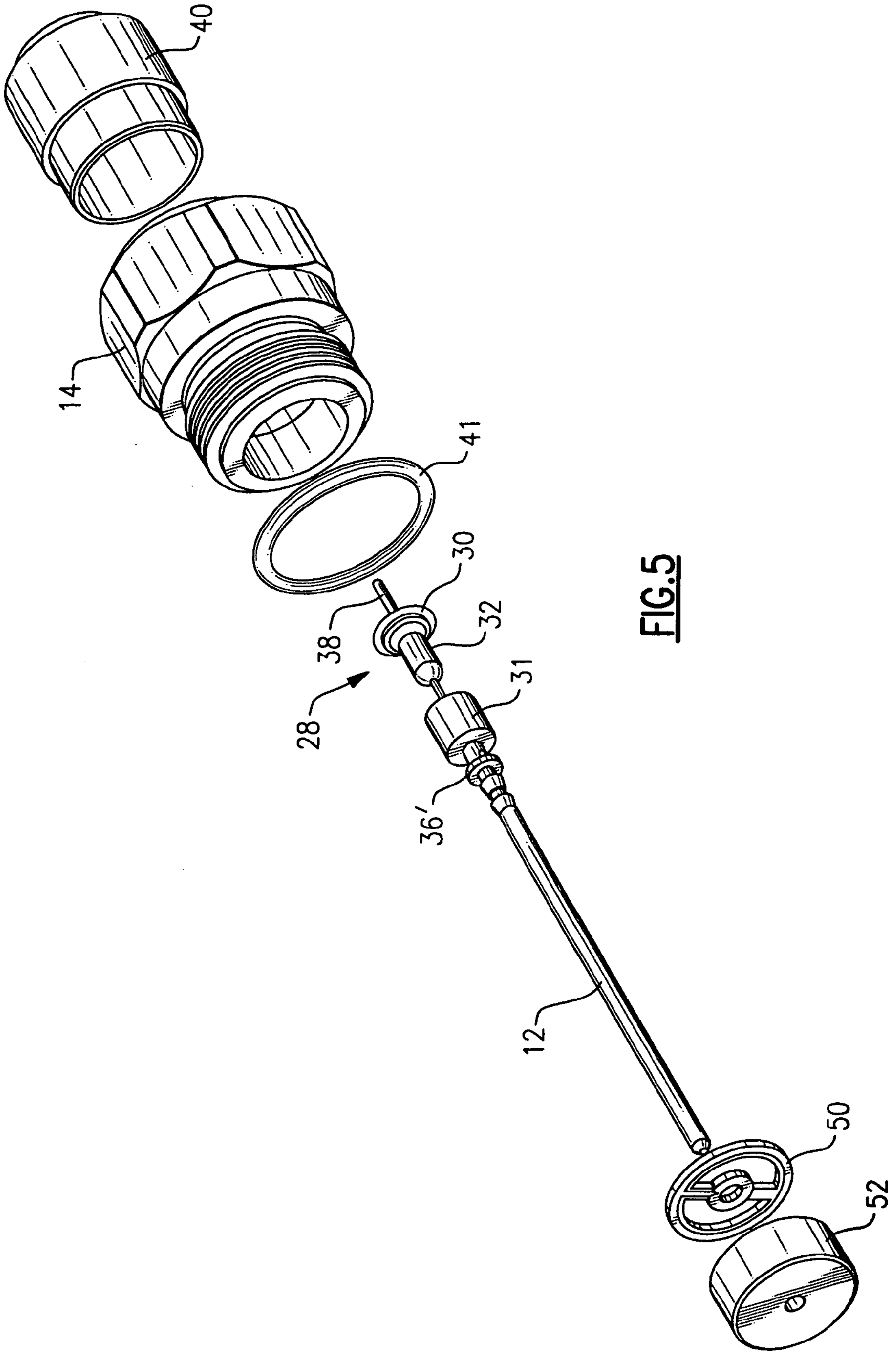
FIG. 5 shows an exploded view of the device of FIG. 4 using the sixth embodiment of the invention.

Referring to FIGS. 4–5, another embodiment of the invention is shown. A coaxial cable connector 10 includes a connector body 14 with an end cap 40 at its second end. An O-ring 41 adjacent a threaded portion 22 seals connector 10 when connector 10 is screwed into a female connection. An electrical component 28 is shown here consisting of a capacitor 30 and a resistor 32 which are housed within cavity 20 inside connector body 14. Capacitor 30 is connected to a lead 38 which in turn is connected, preferably by solder, to connector body 14. Resistor 32 fits inside and is connected to a cover 31 which in turn connects with conductive pin 12. A printed circuit board 50 is held in place within connector body 14 by an insulator 52, which is preferably of plastic. PCB 50 is preferably of standard PCB fiberglass material. A head 36' is preferably integral with conductive pin 12.

The resistor-capacitor network of electrical component 28 which is preferably used in the UMTR of connector 10 consists of a 75 Ohm, ¼ watt, carbon film, non-inductive resistor coupled in series to a 20,000 pF ceramic disc capacitor. The manner in which this series coupling is accomplished allows the network to be packaged very small. The manufacturing steps are as follows: (1) A single-lead bare resistor is placed inside a counterbore in an aluminum block. A bare resistor is one without epoxy coating. The resistor lead protrudes through a hole in the bottom of the counter bore. (2) A small amount of solder paste is applied to the leadless end of the resistor which is pointing upward. (3) A single-lead bare capacitor is placed in a larger counterbore which is coaxial with the resistor counterbore, with the lead facing up. The leadless end of the capacitor contacts the end of the resistor with the solder paste. (4) An aluminum plate with a through hole is placed over the capacitor lead and secured to the first aluminum block to keep the assembly secure and prevent any movement of the electronic components. (5) The entire assembly including the aluminum blocks is placed into an oven to cure the solder paste which physically and electrically bonds the capacitor to the resistor. (6) The entire assembly is removed from the oven and allowed to cool. (7) The RC network is removed from the aluminum blocks. (8) The RC network is coated with epoxy and allowed to cure. The epoxy insulates the assembly and provides additional strength.

Figure 6B:
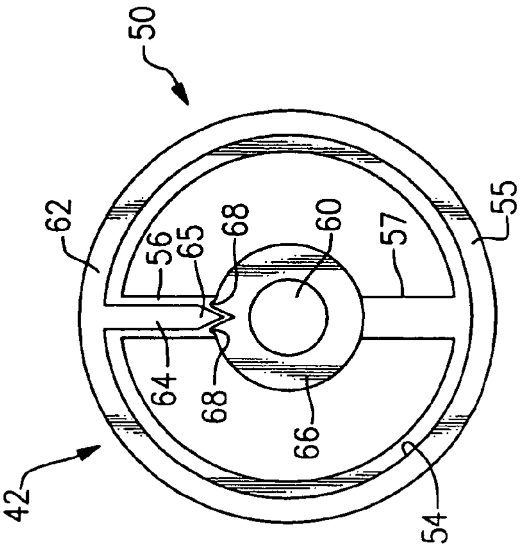
FIG. 6B shows a front elevation view of the sixth embodiment of the invention.
Figure 6D:
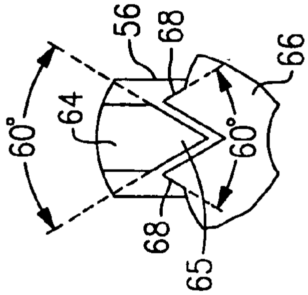
FIG. 6D shows an enlarged view of a portion of the sixth embodiment of the invention showing a spark gap.
Figure 6A:
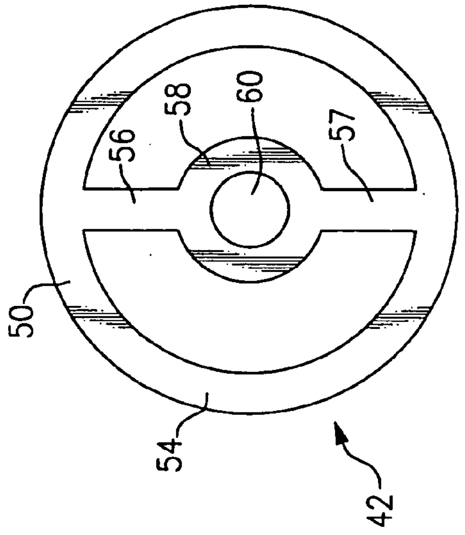
FIG. 6A shows a rear elevation view of the sixth embodiment of the invention.

Referring also to FIG. 6A, a front view of printed circuit board (PCB) 50 is shown. PCB 50 is wheel-shaped with an outer ring 54 and an inner ring 58 connected by two arms or spokes 56, 57. Inner ring 58 defines a circular hole 60 which fits over and makes contact with a head 36' of conductive pin 12.

Referring to FIG. 6B, a printed circuit trace 62 on PCB 50 extends around the surface of a portion of a surface 55 of outer ring 54 so as to make electrical contact with connector body 14 at shoulder 24 (FIG. 4), while a printed circuit trace 66 is on a surface of inner ring 58 so as to make electrical contact with head 36'. Insulator 52 (FIGS. 4–5) ensures good electrical contact of printed circuit trace 62 and printed circuit trace 66 against shoulder 24 and head 36' respectively. An arm 64 of printed circuit trace 62 extends from outer ring 54 to near, but spaced apart from, printed circuit trace 66 on inner ring 58. The space between an end 65 of arm 64 and printed circuit trace 66 forms a spark gap. Using a PCB with printed circuit traces permits much stricter tolerances in the spark gap than do the solid metal embodiments of FIGS. 1–3, and thus increased reliability. Traces 62, 66 are preferably 2 oz copper. In circuit board manufacturing, the copper thickness is specified by a weight in ounces, which is the weight of copper present on a 12"×12" area of board. In the case of a 2 oz copper trace, the thickness of the trace is 0.0028".

Figure 6C:
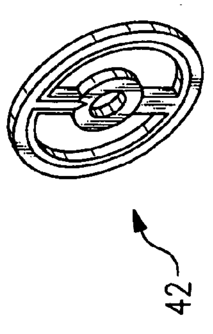
FIG. 6C shows a front perspective view of the sixth embodiment of the invention.

FIG. 6C shows a perspective view of printed circuit traces 62 and 66 on outer ring 54 and inner ring 58, respectively.

FIG. 6D shows the spark gap explained with reference to FIG. 6B in greater detail. Printed circuit 66 preferably includes two triangular pointed members 68 which are joined at a sixty degree angle corresponding to a sixty degree angle of end 65 of arm 64. The three points shared between the two sides of the spark gap ensure reliability when a spark is jumping the gap. It is well known that electrical charge prefers to build up at points rather than along flat areas. When three points are used, one of the points will always be the first point, i.e., the preferred point, jumped by the spark. Should the printed circuit at that point become pitted or vaporized, one of the remaining points theoretically becomes the preferred point. In practice, a layer of carbon from the sparking is deposited on the PCB between the metal traces. This carbon layer is conductive at the high voltage surge levels caused by lightning and becomes the preferred path for the electricity.

Figure 7:
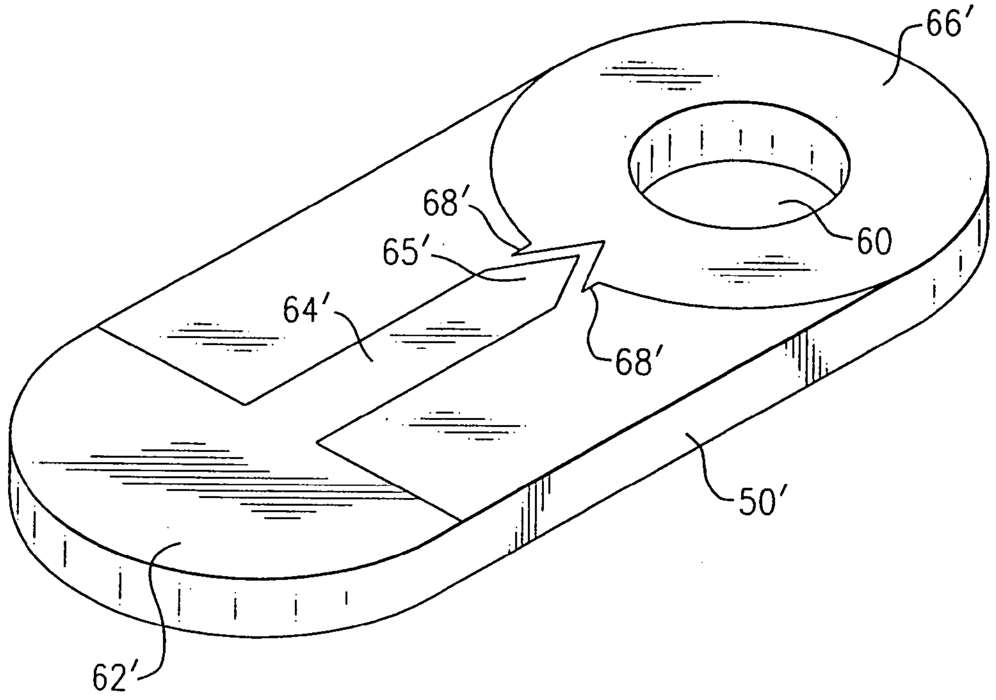
FIG. 7 shows a perspective view of a seventh embodiment of the invention.

Referring to FIG. 7, an embodiment of the present invention is shown in which a PCB 50' has a hole 60 therein. A trace 66' around hole 60 corresponds to inner ring 58 in the embodiment of FIGS. 6A–6D in that trace 66' makes electrical contact with head 36' of conductive pin 12. A trace 62' at an opposite end of PCB 50' from trace 66' corresponds to outer ring 54 of the embodiment of FIGS. 6A–6D in that trace 62' makes electrical contact with shoulder 24 of connector body 14. An arm 64' of trace 62' includes an end 65' which forms a spark gap with pointed members 68' of trace 66'. Because insulator 52 ensures good electrical contact between traces 62', 66' on PCB 50' and shoulder 24 and head 36', respectively, the shape of PCB 50' can be varied as long as the proper electrical contacts are made.

The relationship between the size of the spark gap and the voltage level which triggers a spark is well known in the art. For instance, a spark gap of 0.005" air is typical. For CATV systems, the systems typically carry an operating voltage of 90 VAC at 60 Hz to power intermediate amplifiers and other conditioning equipment. This voltage is of course blocked before entering the internal cabling of a house or other end user. The spark gap is preferably set so that a trip voltage of 300 Volts or more is required to bridge the gap. The carbon layer described above lowers the trip voltage for subsequent surges, so after the first major surge, the trip voltage goes down from 300 Volts to around 200 Volts. The trip voltage has to be above the operating voltage of the cable system but below the voltage which would damage the electrical components in the device which are protected by the present invention.

While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed is:

1. A surge protection element for use in a cable connector, comprising:

a printed circuit board including an inner ring and a first arm extending outward from said inner ring;

a first trace on at least a portion of said inner ring, said first trace being disposed such that said first trace is electrically connected to a signal portion of said cable connector when said surge protection element is installed in said cable connector; and a second trace on at least a portion of said first arm, said second trace being disposed such that said second trace is electrically connected to a ground portion of said cable connector when said surge protection element is installed in said cable connector;

wherein said first and second traces are separated by a spark gap.

2. A device according to claim 1, wherein said printed circuit board further includes a second arm, wherein said second arm is integral with said inner ring and said first arm.

3. A device according to claim 1, wherein said printed circuit board further includes a second arm, wherein said second arm is one-piece with said inner ring and said first arm.

4. A device according to claim 1, wherein said printed circuit board further includes at least a segment of an outer ring, wherein said segment is integral with said first arm.

5. A device according to claim 4, wherein said printed circuit board further includes a second arm, wherein said second arm is integral with said inner ring, said first arm, and said segment.

6. A device according to claim 4, wherein said printed circuit board further includes a second arm, wherein said second arm is one-piece with said inner ring, said first arm, and said segment.

7. A device according to claim 4, wherein said second trace is on at least a portion of said segment.

8. A device according to claim 4, wherein said printed circuit board further includes an outer ring integral with said first arm, wherein said inner and outer rings are concentric.

9. A device according to claim 8, wherein said second trace is on at least a portion of said outer ring.

10. A device according to claim 9, wherein said second trace is on all of one surface of said outer ring.

11. A device according to claim 8, wherein said printed circuit board further includes a second arm, wherein said second arm is integral with said inner ring, said first arm, and said outer ring.

12. A device according to claim 8, wherein said printed circuit board further includes a second arm, wherein said second arm is one-piece with said inner ring, said first arm, and said outer ring.

13. A device according to claim 1, wherein said surge protection element is positioned entirely within a cavity contained within said cable connector when said surge protection element is installed in said cable connector.

14. A device according to claim 1, wherein said first trace includes a first pointed end adjacent said spark gap, and said second trace includes second and third pointed ends adjacent said spark gap, with said second and third pointed ends defining a space between them where said first pointed end is positioned.

15. In a CATV system that includes a coaxial cable having a central conductor, an outer conductor concentrically positioned in surrounding relation thereto, and a dielectric layer disposed between the central and outer conductors, a high voltage surge protection device adapted for use in the CATV system, comprising:

a connection housing having a first end and a body portion that defines an internal cavity;

an electronic component positioned within said cavity; and a surge protection element positioned entirely within said cavity and between said body portion and said electronic component, wherein said element includes a printed circuit board which includes an inner ring and a first arm extending outward from said inner ring; a first trace on at least a portion of said inner ring, said first trace being disposed such that said first trace is electrically connected to said electronic component; and a second trace on at least a portion of said first arm, said second trace being disposed such that said second trace is electrically connected to said housing;

wherein said first and second traces are separated by a spark gap.

16. The high voltage surge protection device of claim 15, wherein said electrical component is electrically connected to a conductive pin extending therefrom that is electrically interconnected to said central conductor of said coaxial cable.

17. The high voltage surge protection device of claim 16, wherein said conductive pin includes a head which is physically and electrically connected to said first trace.

* * * * *